(12) United States Patent
Yoshida

(10) Patent No.: US 8,266,928 B2  
(45) Date of Patent: Sep. 18, 2012

(54) BURNER FOR MANUFACTURING POROUS GLASS BASE MATERIAL, AND MANUFACTURING METHOD OF POROUS GLASS BASE MATERIAL

(75) Inventor: Makoto Yoshida, Ibaraki (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 283 days.

(21) Appl. No.: 12/710,322

(22) Filed: Feb. 22, 2010

(65) Prior Publication Data  
US 2010/0212357 A1 Aug. 26, 2010

(30) Foreign Application Priority Data  
Feb. 24, 2009 (JP) ................ 2009-040775

(51) Int. Cl.  
*C03B 37/018* (2006.01)

(52) U.S. Cl. ........................................ 65/531

(58) Field of Classification Search ............ 65/531  
See application file for complete search history.

(56) References Cited

U.S. PATENT DOCUMENTS

| | | | | |
|---|---|---|---|---|
| 4,474,593 A * | 10/1984 | Andrejco et al. | ............... | 65/415 |
| 4,604,118 A * | 8/1986 | Bocko et al. | ............... | 65/416 |
| 4,810,189 A | 3/1989 | Mikami et al. | | |
| 5,174,803 A * | 12/1992 | O'Brien, Jr. | ............... | 65/271 |
| 5,788,730 A * | 8/1998 | Ruppert et al. | ............... | 65/17.4 |
| 6,334,339 B1 * | 1/2002 | Kanao et al. | ............... | 65/531 |
| 6,588,230 B1 * | 7/2003 | Adler et al. | ............... | 65/17.3 |
| 6,751,987 B1 * | 6/2004 | Ball et al. | ............... | 65/17.4 |
| 6,837,076 B2 * | 1/2005 | Hawtof | ............... | 65/413 |
| 2005/0223750 A1 * | 10/2005 | Nutini et al. | ............... | 65/413 |
| 2006/0130531 A1 * | 6/2006 | Kang et al. | ............... | 65/531 |

FOREIGN PATENT DOCUMENTS

| JP | 62-187135 A | 8/1987 |
|---|---|---|
| JP | H6-247722 A | 9/1994 |
| JP | H11-21136 A | 1/1999 |

\* cited by examiner

*Primary Examiner* — John Hoffmann  
(74) *Attorney, Agent, or Firm* — Chen Yoshimura LLP

(57) ABSTRACT

Provided is a burner for manufacturing a porous glass base material, the burner having: a glass raw material gas ejection port; a burnable gas ejection port provided around and centered on the glass raw material gas ejection port; and one or more sequences of small diameter auxiliary gas ejection ports provided inside the burnable gas ejection port, to be coaxial with respect to the glass raw material gas ejection port, where in each of the sequences, the small diameter auxiliary gas ejection ports have the same focal length as each other, and have a concave portion at an end surface thereof.

4 Claims, 9 Drawing Sheets

BURNER FOR MANUFACTURING POROUS GLASS BASE MATERIAL, AND MANUFACTURING METHOD OF POROUS GLASS BASE MATERIAL

BACKGROUND

1. Technical Field

The present invention relates to a multi-nozzle burner for manufacturing a porous glass base material, which includes a small diameter auxiliary gas ejection port in a burnable gas ejection port, and to a manufacturing method of a porous glass base material. The present application claims priority from a Japanese Patent Application No. 2009-40775 filed on Feb. 24, 2009, the contents of which are incorporated herein by reference.

2. Related Art

Conventionally, various methods have been proposed to manufacture an optical fiber base material. Among these methods, outside vapor phase deposition (OVD) is frequently used because comparatively various refractive index distributions can result and optical fiber base materials of a large diameter can be mass produced. In OVD, a starting member of about 50 mm $\phi$ is rotated and either the burner or the starting member is reciprocated relative to each other, then glass particles generated in the burner flame are deposited to generate a soot having a thickness of about 250-350 mm$\phi$, and the result is dehydrated and sintered in an electric furnace.

A concentric multi-tube burner has been conventionally used to synthesize glass particle depositions. A burner having such a structure cannot sufficiently mix the glass raw material gas, the burnable gas, and the auxiliary gas, which has resulted in insufficient generation of glass particles, to lead to poor yields to prevent high speed synthesis.

So as to solve this problem, Patent Document No. 1 proposes a multi-nozzle burner having a burnable gas ejection port, in which a small diameter auxiliary gas ejection port is provided to be around and centered on a raw material gas ejection port. Patent Document No. 2 proposes reducing the material thickness of the small diameter gas ejection port, and a method of increasing the speed of ejected gas flow to 20 m/s or faster. Patent Document No. 3 proposes making the edges of the dividing walls between gas flow paths of a multi-tube burner to have acute angles, blunt angles, or round shapes. The following lists the patent documents used in this specification.

Patent Document No. 1: Japanese Patent Publication No. 1773359
Patent Document No. 2: Japanese Patent Application Publication No. H6-247722
Patent Document No. 3: Japanese Patent Application Publication No. H11-21136

SUMMARY

However, in the multi-nozzle burner proposed by Patent Document No. 1, the auxiliary gas ejected from the small diameter gas ejection port included in the auxiliary gas ejection port is in the proximity of the burnable gas flowing around the small diameter gas ejection port. Therefore, when the flow velocity of the auxiliary gas is slow, the tip of the small diameter gas ejection port is very easily burned, to change the deposition density of the glass particles over time in the progress of the burning, and to increase the variations of the deposition forms, which are unfavorable. Moreover, when the tip is burned, the glass particles adhered to the tip are crystallized to fly apart to be taken in into the porous glass base material, and air bubbles tend to be generated after vitrification.

In Patent Document 2, which is directed to reducing the material thickness of the small diameter gas ejection port and to a method of increasing the speed of ejected gas flow to 20 m/s or faster, if OVD is used, the targeted diameter will increase or become thick as the deposition progresses. Therefore, generally speaking, at the latter half of the deposition process, the amount of gas flow should be increased. However, if the amount of gas flow and the gas flow velocity are determined to optimize the deposition efficiency in the latter half of the deposition process, in the beginning of the deposition process where the targeted diameter is still narrow, the gas flow velocity becomes too slow due to the small amount of gas flow. As a result, the tip (outlet edge) of the small diameter gas ejection port tends to be easily burned.

Moreover, in the method proposed in Patent Document No. 3, the edges of the dividing walls between gas flow paths of a ring-shaped concentric multi-tube burner are made to have acute angle, blunt angle, or round shapes so as to restrain generation of a locally low pressure portion or swirls in the gas flow. However, removal of angled or edged portions in the limited material thickness of the tube, although helping reduce the frequency of the swirl generation or its extent, was not able to completely eliminate generation of swirls. In particular, where the burnable gas is in the vicinity of the auxiliary gas, the generation of the swirls is directly associated with the burn of the tip of the tube, to easily change the form of the tip over time.

Therefore, it is an object of an aspect of the innovations herein to provide a multi-nozzle burner for manufacturing a porous glass base material, in which a burnable gas ejection port is adjacent to a small diameter auxiliary gas ejection port without seal gas therebetween, which are able to prevent burn at the tip of the small diameter gas ejection port even in the region where the flow rate of the small diameter gas ejection port is small, and to provide a corresponding manufacturing method of a porous glass base material.

So as to solve the above-stated problem, according to a first aspect related to the innovations herein, provided is a burner for manufacturing a porous glass base material, the burner having: a glass raw material gas ejection port; a burnable gas ejection port provided around and centered on the glass raw material gas ejection port; and one or more sequences of small diameter auxiliary gas ejection ports provided inside the burnable gas ejection port, to be coaxial with respect to the glass raw material gas ejection port, where in each of the sequences, the small diameter auxiliary gas ejection ports have the same focal length as each other, and have a concave portion at an end surface thereof.

So as to solve the above-stated problem, according to a second aspect related to the innovations herein, provided is a manufacturing method of a porous glass base material, the manufacturing method having: depositing glass particles using a burner for manufacturing a porous glass base material, the burner including: a glass raw material gas ejection port; a burnable gas ejection port provided around and centered on the glass raw material gas ejection port; and one or more sequences of small diameter auxiliary gas ejection ports provided inside the burnable gas ejection port, to be coaxial with respect to the glass raw material gas ejection port, where in each of the sequences, the small diameter auxiliary gas ejection ports have the same focal length as each other, and have a concave portion at an end surface thereof.

The summary clause does not necessarily describe all necessary features of the embodiments of the present invention.

The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Some aspects of the invention will now be described based on the embodiments, which do not intend to limit the scope of the present invention, but exemplify the invention. All of the features and the combinations thereof described in the embodiment are not necessarily essential to the invention. The same or similar elements may occasionally be provided with the same reference numeral, to omit the related description thereof.

The following describes in greater details a method and an apparatus for manufacturing an optical fiber base material according to the present invention, with reference to the drawings.

Figure 1:
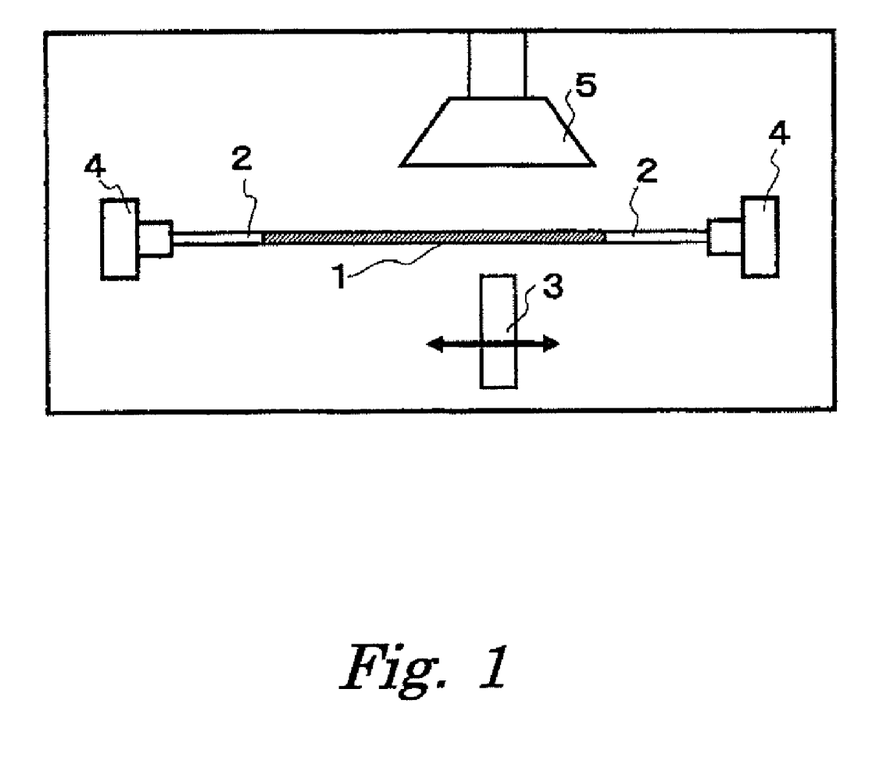
FIG. 1 is a schematic view of an exemplary manufacturing apparatus of a porous glass base material.

FIG. 1 is a schematic view of an exemplary manufacturing apparatus of a porous glass base material, where each end of the core rod 1 of the starting member is welded to a dummy rod 2, and the starting member is supported rotatably by the apparatus by means of an ingot chuck mechanism 4. A fiber raw material such as a $SiCl_4$ and a combustion gas (hydrogen gas and oxygen gas) are ejected from the burner 3, and the burner 3 is reciprocated along the starting member by means of the burner guide mechanism, to deposit onto the starting member glass particles (soot) generated by the hydrolysis in the oxyhydrogen flame, thereby obtaining an optical fiber porous base material. The glass particles not adhered are exhausted to outside of the system from an exhaustion hood 5. The obtained porous glass base material is passed through a heating furnace, for dehydration and vitrification, thereby obtaining an optical fiber base material.

Figure 2:
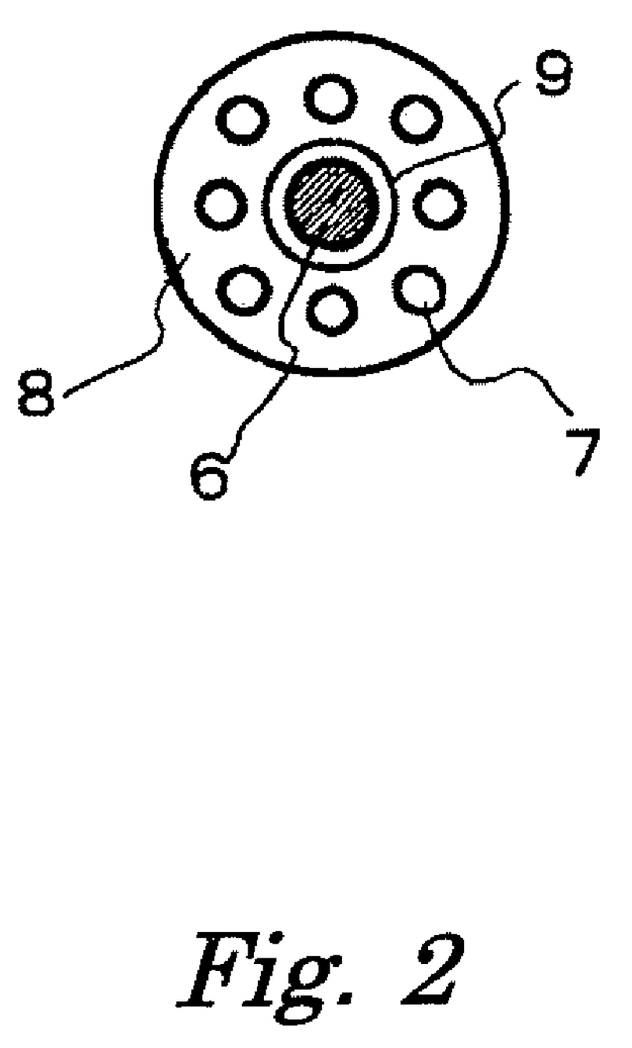
FIG. 2 is a schematic cross-sectional view of a tip of a burner for synthesizing glass particles.
Figure 3:
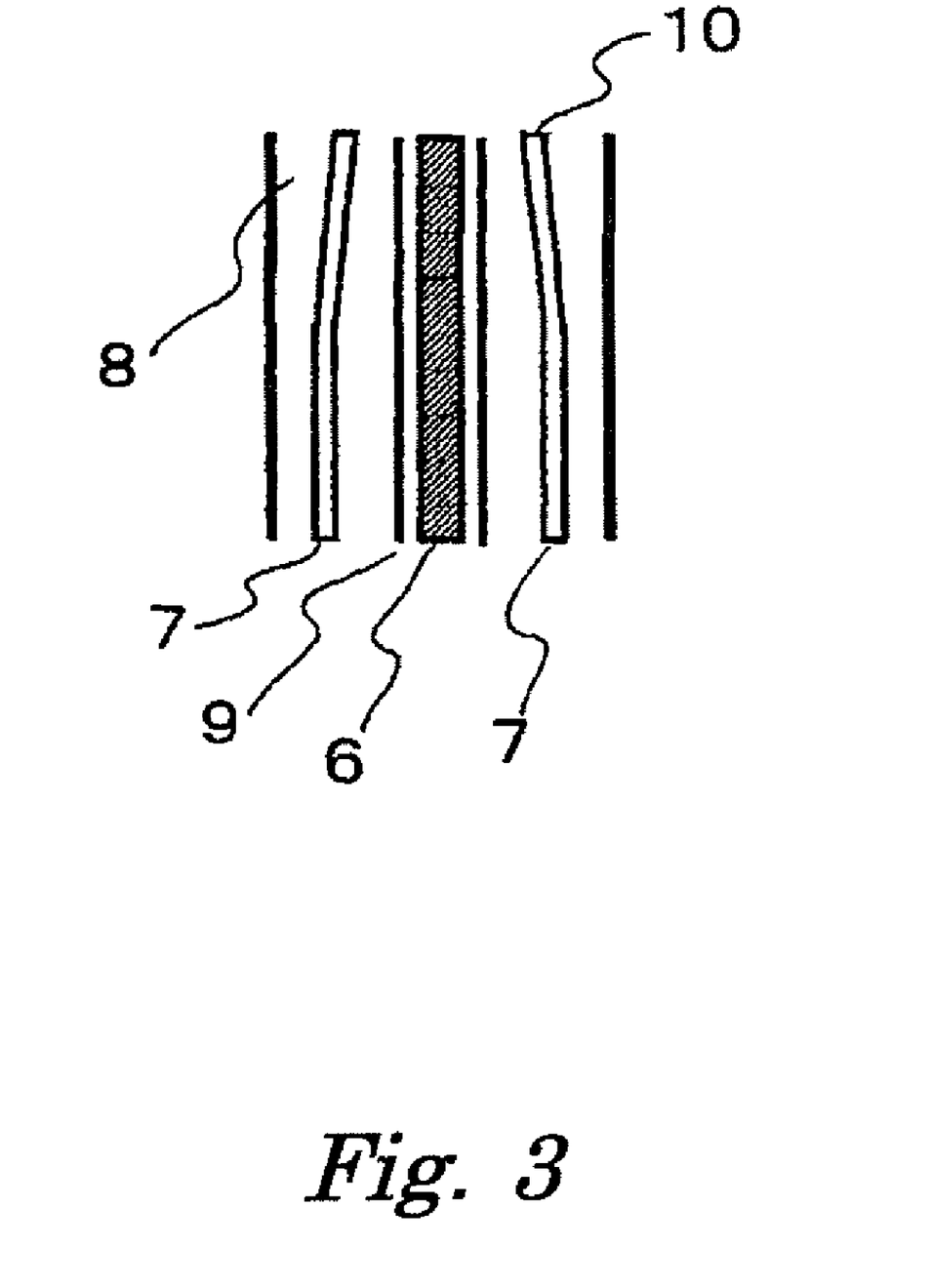
FIG. 3 is a schematic longitudinal-sectional view of a tip of a burner for synthesizing glass particles.

FIG. 2 is a schematic cross-sectional view of a tip of a burner, and FIG. 3 is a schematic longitudinal-sectional view thereof. In the drawings, inside a burnable gas ejection port 8, one or more sequences of small diameter auxiliary gas ejection ports 7 are provided coaxially around a glass raw material gas ejection port 6 at the center. Note that the reference numeral 9 represents a seal gas ejection port, and the reference numeral 10 represents a tip of the small diameter auxiliary gas ejection port.

Figure 4:
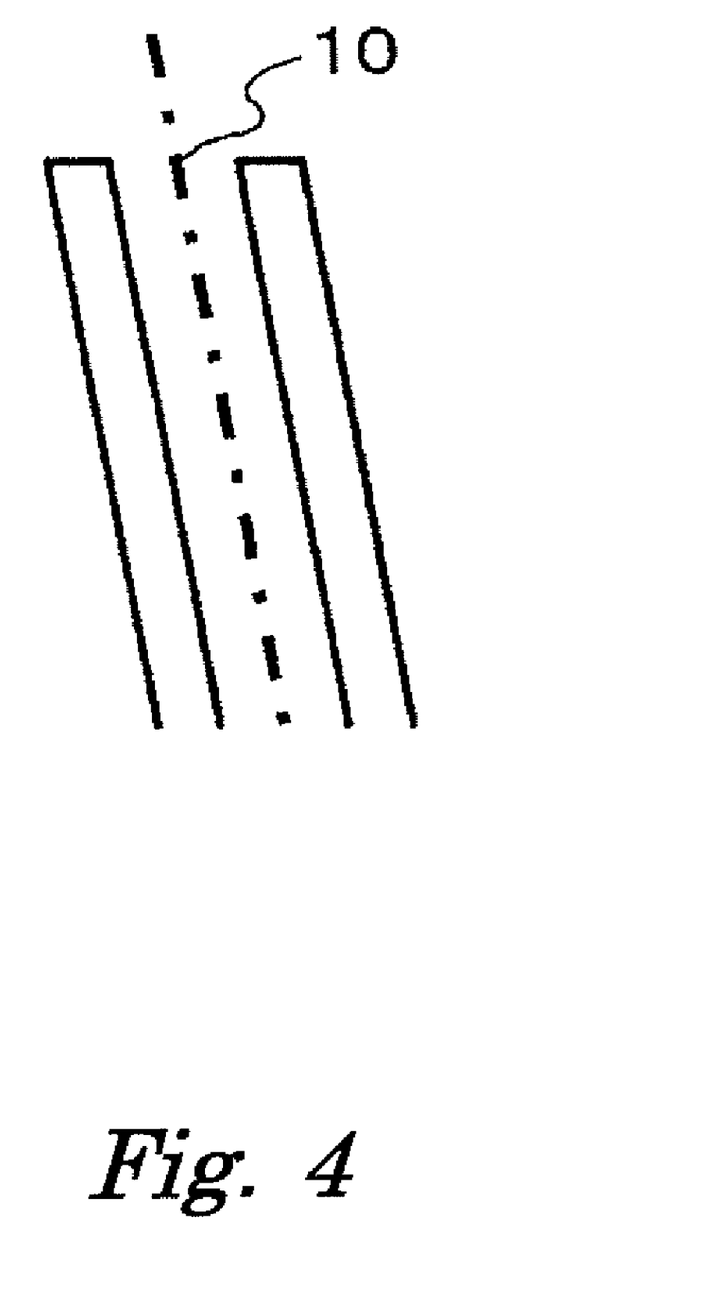
FIG. 4 is a schematic sectional view of an enlarged view of the tip of a conventional small diameter gas ejection port.

FIG. 4 is a schematic sectional view of an enlarged view of the tip 10 of a conventional small diameter gas ejection port, where the end surface of the tube wall of the small diameter auxiliary gas ejection port is flat cut.

Figure 5A:
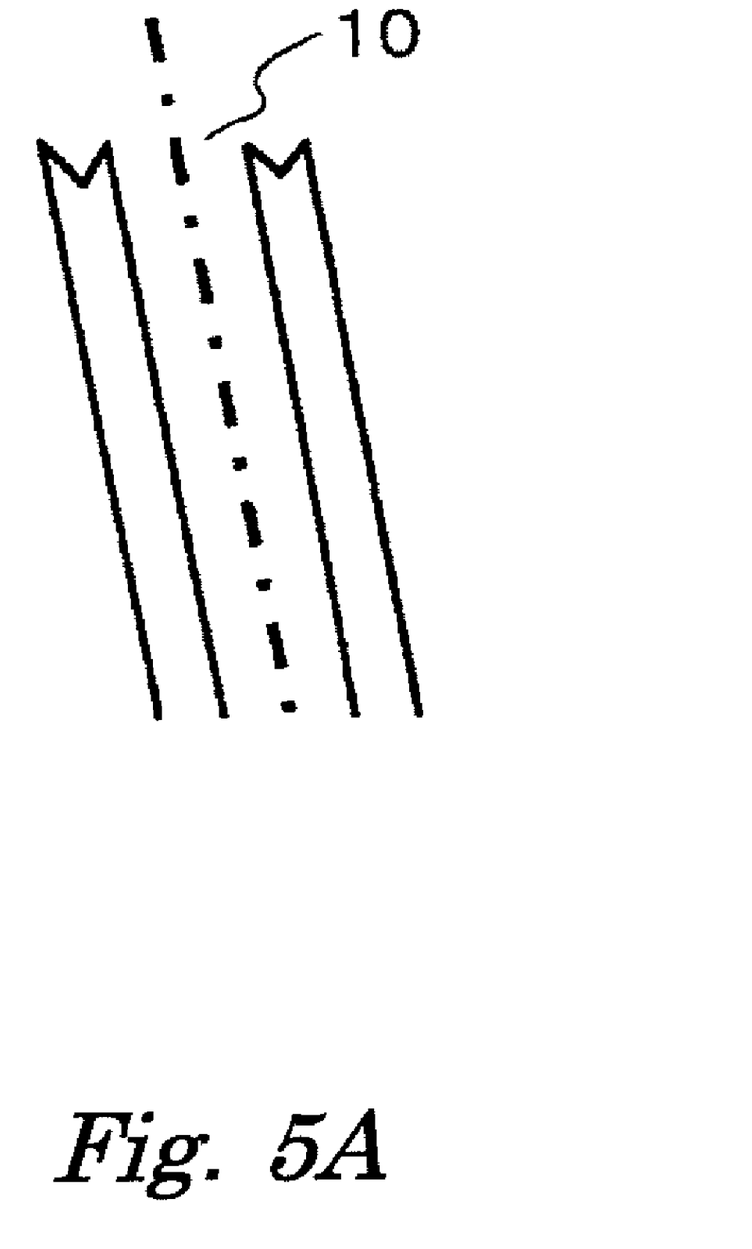
FIG. 5A is a schematic sectional view of an enlarged view of the tip of a small diameter gas ejection port of the present invention.
Figure 5B:
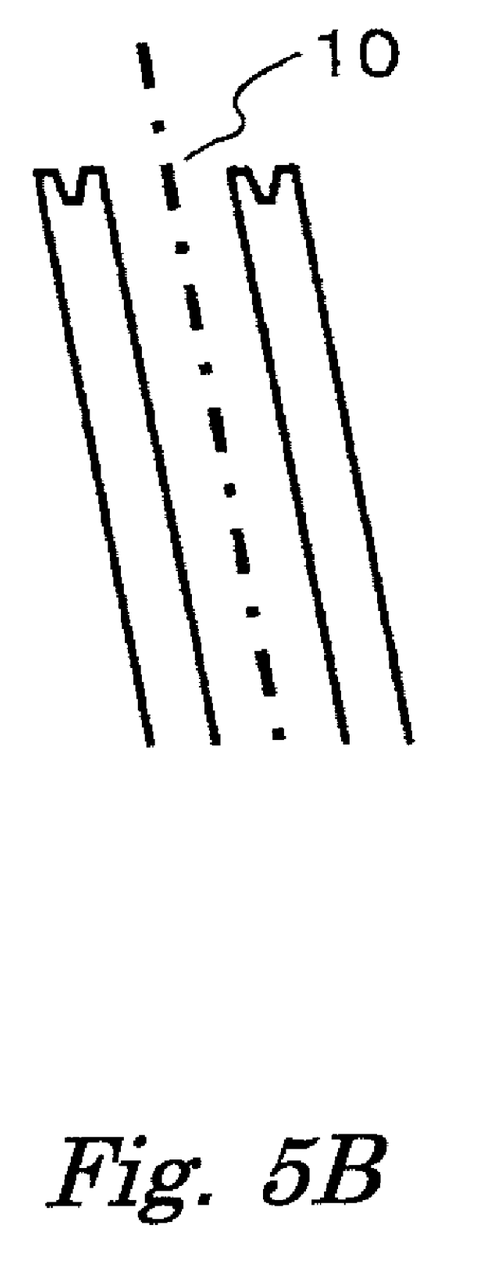
FIG. 5B is a schematic sectional view of an enlarged view of the tip of a small diameter gas ejection port of the present invention.

FIG. 5A and FIG. 5B are respectively a schematic sectional view of an enlarged view of the tip of a small diameter gas ejection port of the present invention, where a concave portion is provided for the end surface of the tube wall, at the center in the thickness direction thereof, in each of FIG. 5A and FIG. 5B. Note that the concave portion of the end surface is provided so that the ratio between the tube thickness D of the tip of the small diameter auxiliary gas ejection port and the maximum depth H of the concave portion of the end surface satisfies the relation $D/H \leq 2.5$. When $D/H > 2.5$, it is not desirable because the end surface will be burned due to the swirling current generated in the gas flow ejected from the burner.

Figure 6A:
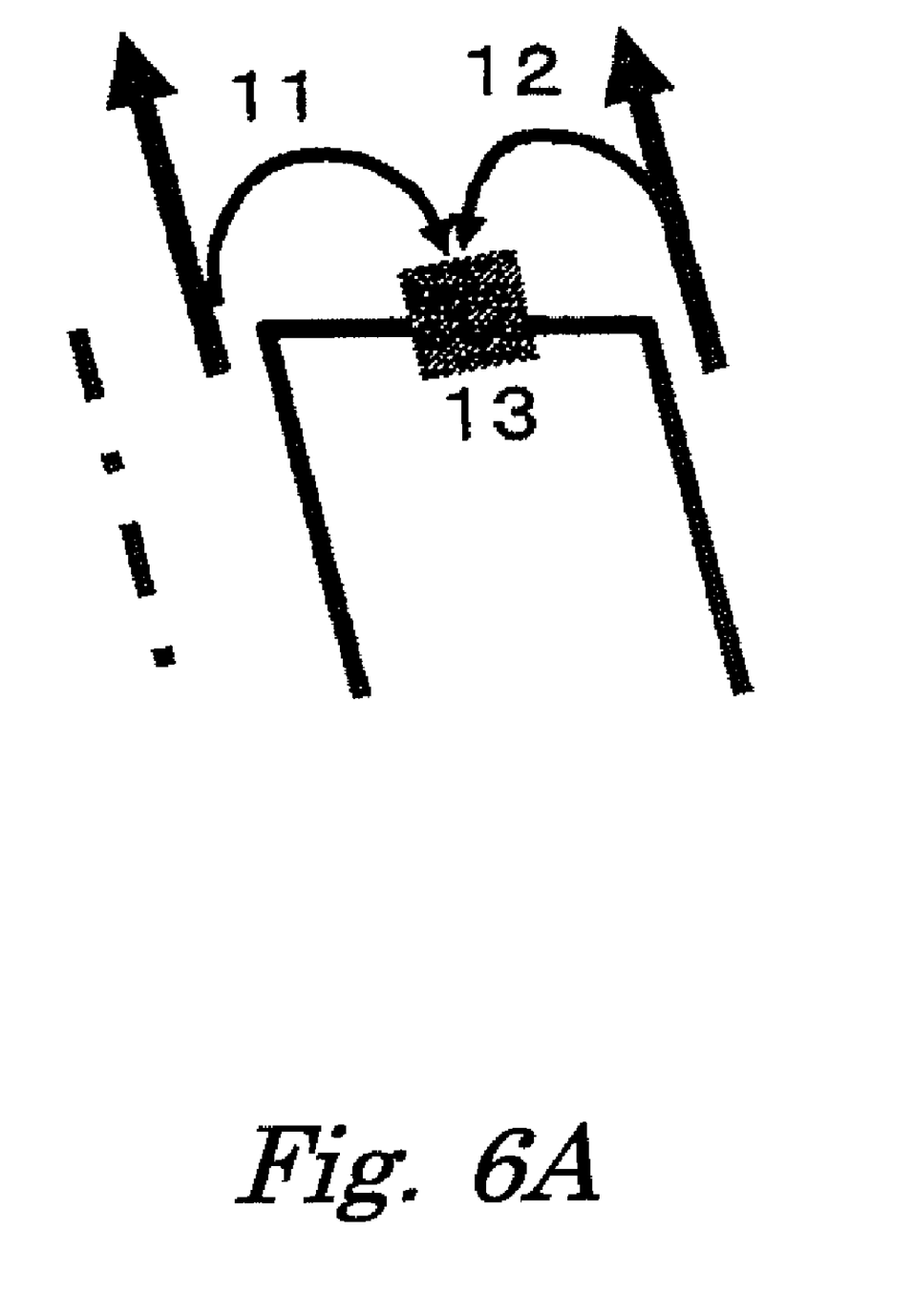
FIG. 6A is a schematic view for explaining the gas flow in the vicinity of the tip of the small diameter gas ejection port.

When the flow rate of the small diameter auxiliary gas is small, part of the auxiliary gas and the burnable gas running inside and outside the tube wall 14 of the small diameter gas ejection port is wound towards the end surface side as shown in FIG. 6A. This causes a swirling current 11 in the auxiliary gas as well as a swirling current 12 in the burnable gas, and both of the swirling currents collide to react in the vicinity of the center of the tip of the small diameter auxiliary gas ejection port, to raise the atmospheric temperature in the vicinity thereof, to generate a high temperature region 13. As a result, the central portion of the tip of the small diameter auxiliary gas ejection port will cause a burn, and the burning gradually progresses.

Figure 6B:
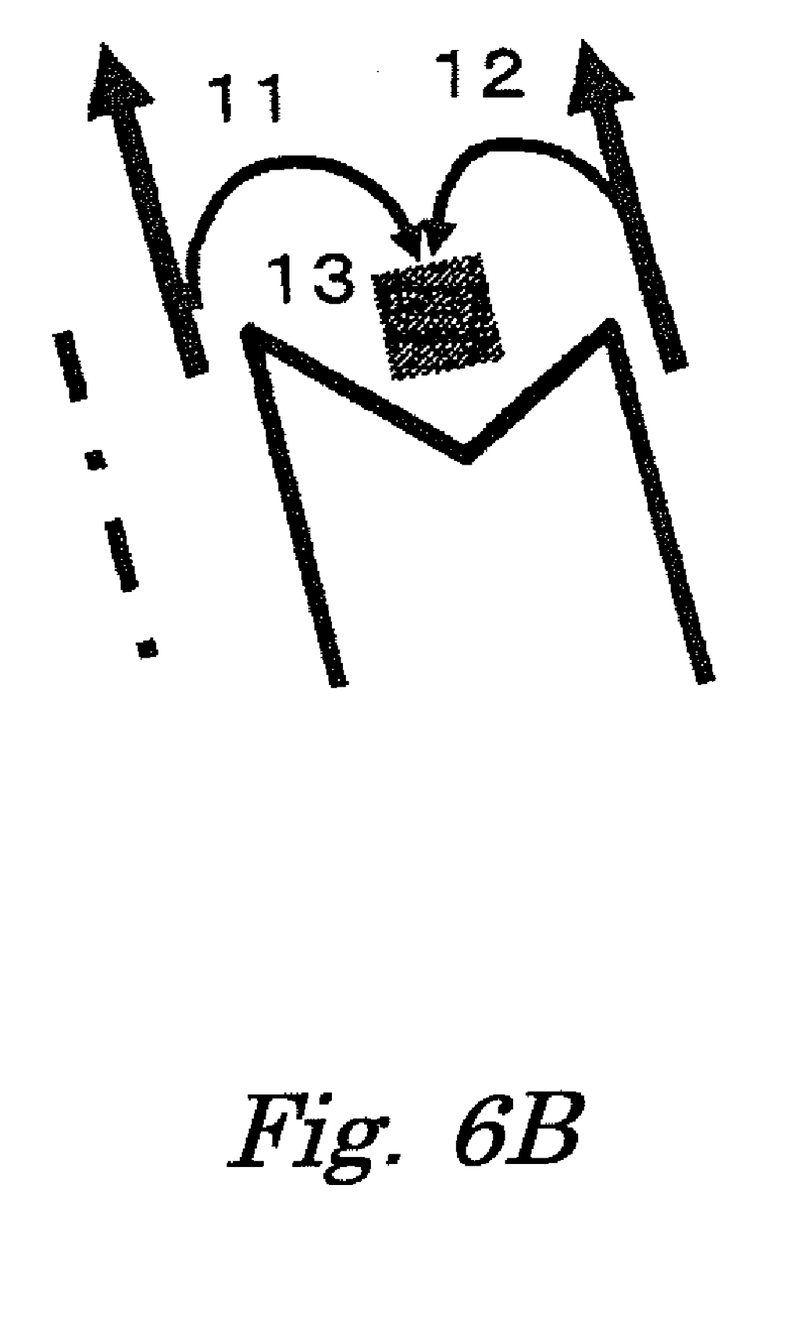
FIG. 6B is a schematic view for explaining the gas flow in the vicinity of the tip of the small diameter gas ejection port.

Next, as shown in FIG. 6B, if a concave portion is provided in the center, in the thickness direction, of the end surface of the tube wall of the small diameter auxiliary gas ejection port, the swirling currents 11 and 12 wound towards the end surface will collide, and generate the high temperature region 13. However, this high temperature region 13 is provided in the concave portion, and so the tip will not burn even when the flow rate is small.

EMBODIMENT EXAMPLES

Embodiment Example 1

A porous glass base material is manufactured in OVD using an apparatus such as shown in FIG. 1. As shown in FIGS. 2 and 3, inside a burnable gas ejection port of the burner, one sequence of small diameter auxiliary gas ejection ports is provided coaxially around a glass raw material gas ejection port at the center, each small diameter auxiliary gas ejection port having the same focal length of 150 mm. The tip of the small diameter gas ejection port is formed as in FIG. 5A, and the tube thickness of thereof is 1.5 mm, and the depth of the concave portion is 0.3 mm.

The gases as listed in Table 1 are flown to this burner, to deposit glass particles onto the starting member to which the dummy rods, each having an outer diameter of 50 mm, are welded to the ends of the core rod having an outer diameter of 50 mm, to produce 30 porous glass base materials having an outer diameter of 250 mm.

TABLE 1

| first tube (glass raw material gas) | $SiCl_4 + O_2$ |
|---|---|
| second tube | seal gas |
| small diameter auxiliary gas ejection port | $O_2$ |
| third tube (burnable gas) | $H_2$ |

The flow amount of $O_2$ gas ejected from the small diameter gas ejection port is gradually increased towards the latter half of deposition. According to the change in the amount of gas flow, the gas flow velocity changed from the 3 m/s at the start of the deposition, to 32 m/s at the end of the deposition.

Figure 7:
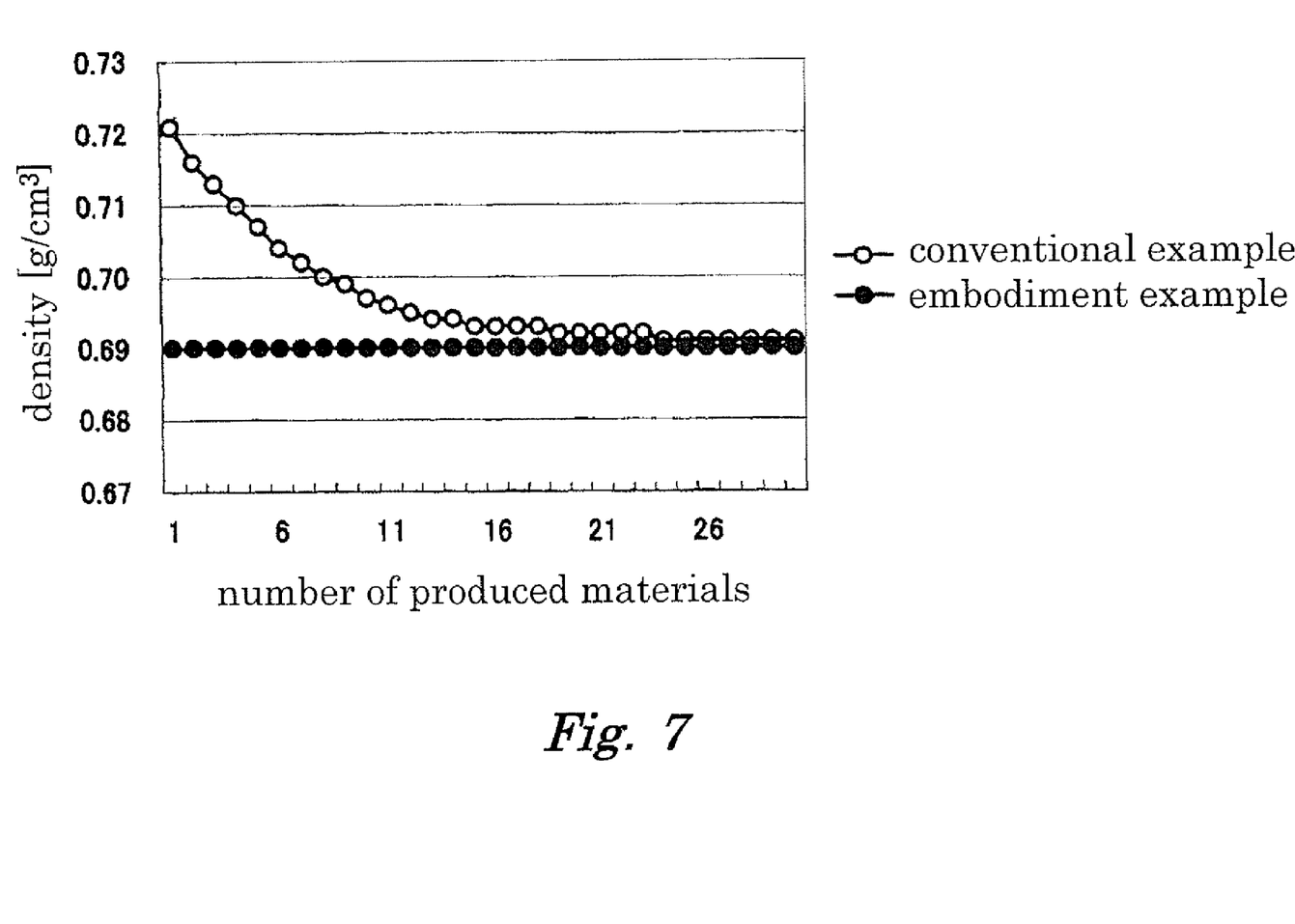
FIG. 7 is a graph showing the density change of the porous glass base materials for the embodiment example and the conventional example.

As a result, even after 30 porous glass base materials are produced, the deformation or devitrification were not observed in the small diameter auxiliary gas ejection nozzle. The density of the produced 30 porous glass base materials was measured, and the result is shown in FIG. 7. As shown in the drawing, the density is constant at 0.69 g/cm. The produced porous glass base materials are vitrified, to observe 0.8 of 30 porous glass base materials generated air bubbles, on average.

Comparison Example 1

As Comparison Example 1, 30 porous glass base materials were produced on the same condition as that of Embodiment Example 1, except for usage of a burner in which the tip of the small diameter gas ejection port is flat cut as shown in FIG. 4. As a result, the deformation started to be observed after producing one porous glass base material, due to the burning of the center of the tip of the small diameter gas ejection port. By the time 30 porous glass base materials were produced, the deformation of the depth of about 0.25 mm was observed on the end surface.

The density of thus produced porous glass base materials is gradually decreased as shown in the conventional example of FIG. 7. The produced porous glass base materials were vitrified. The result shows 3.2 of 30 porous glass base materials have generated air bubbles, on average, which is significantly larger than 0.8 in Embodiment Example 1.

Embodiment Example 2

30 porous glass base materials were produced by changing the tube thickness D of the tip of the small diameter gas ejection port and the depth H of the concave portion, and in the combinations as shown in Table 2, just as in Embodiment Example 1.

TABLE 2

| tube thickness D (mm) | 0.75 | 0.75 | 0.75 | 0.75 | 1.00 | 1.00 | 1.00 | 1.00 |
|---|---|---|---|---|---|---|---|---|
| depth of concave portion (mm) | 0.1 | 0.2 | 0.3 | 0.4 | 0.1 | 0.2 | 0.3 | 0.4 |
| D/H | 7.5 | 3.8 | 2.5 | 1.9 | 10 | 5.0 | 3.3 | 2.5 |
| occurrence of tip burning | yes | yes | no | no | yes | yes | no | no |

Consequently, the range that does not cause burning at the tip of the small gas ejection port is respectively $D/H \leq 2.5$ for the tube thickness of 0.75 mm, and $D/H \leq 3.3$ for the tube thickness of 1.0 mm.

As shown above, by providing a concave portion at part of the end surface of the small diameter gas ejection port (specifically, in the end surface at the center in the thickness direction) inside the burnable gas ejection port, burning was successfully prevented by avoiding a high temperature region due to the reaction at the tip. Accordingly, the tip form will not change, to prevent change in state and form of the deposition over time, and to prevent occurrence of flying of the glass due to devitrification at the tip of the burner. These help prevent generation of air bubbles in the base materials.

Although some aspects of the present invention have been described by way of exemplary embodiments, it should be understood that those skilled in the art might make many changes and substitutions without departing from the spirit and the scope of the present invention which is defined only by the appended claims.

The operations, the processes, the steps, or the like in the apparatus, the system, the program, and the method described in the claims, the specification, and the drawings are not necessarily performed in the described order. The operations, the processes, the steps, or the like can be performed in an arbitrary order, unless the output of the former-described processing is used in the later processing. Even when expressions such as "First," or "Next," or the like are used to explain the operational flow in the claims, the specification, or the drawings, they are intended to facilitate the understanding of the invention, and are never intended to show that the described order is mandatory.

What is claimed is:

1. A burner for manufacturing a porous glass base material, the burner comprising:
   a glass raw material gas ejection tube;
   a burnable gas ejection tube provided around and centered on the glass raw material gas ejection tube; and
   one or more sequences of auxiliary gas ejection tubes provided inside the burnable gas ejection tube, to be coaxial with respect to the glass raw material gas ejection tube, each of the auxiliary gas ejection tubes having an auxiliary gas ejection port at an end thereof whose perimeter is defined by the inner surface of the auxiliary gas ejection tube at the end of the auxiliary gas ejection tube, such that the auxiliary gas ejection tube has a front surface bounded on one side by the inner surface of the auxiliary gas ejection tube at the end of the auxiliary gas ejection tube and bounded on the other side by the outer surface of the auxiliary gas ejection tube at the end of the auxiliary gas ejection tube, wherein
   in each of the sequences, the auxiliary gas ejection ports have the same focal length as each other, and
   each of the auxiliary gas ejection tubes has a concave portion formed in the front surface so as to extend to a maximum depth H in the axial direction of the auxiliary gas ejection tube.

2. The burner according to claim 1, wherein
   the concave portion of each of the auxiliary gas ejection tubes is at the center of the front surface, in a thickness direction defined between the inner surface and the outer surface of the auxiliary gas ejection tube at the end of the auxiliary gas ejection tube.

3. The burner according to claim 1, wherein
each of the plurality of auxiliary gas ejection tubes has a tube thickness D in a thickness direction defined between the inner surface and the outer surface of the auxiliary gas ejection tube at the end of the auxiliary gas ejection tube, and
for each of the plurality of auxiliary gas ejection tubes, the ratio between the tube thickness D and the maximum depth H of the concave portion satisfies the relation $D/H \leqq 2.5$.

4. A manufacturing apparatus for manufacturing a porous glass base material, the apparatus comprising:
the burner according to claim 1;
a chuck mechanism for rotatably supporting a starting member comprising a core rod each of whose ends is welded to a dummy rod; and
a burner guide mechanism for reciprocating the burner along the starting member.

* * * * *